Figure 1:
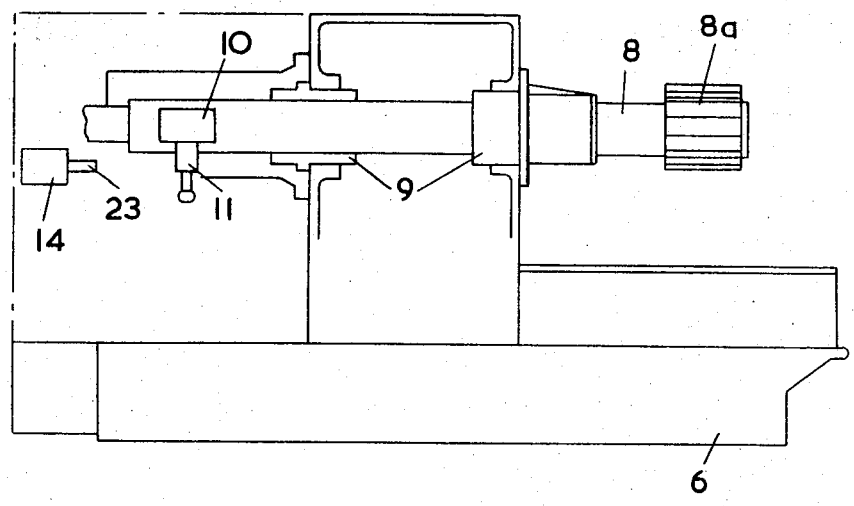

United States Patent [19]
Marshall

[11] 3,855,885
[45] Dec. 24, 1974

[54] ADJUSTABLE STOP MEANS

[76] Inventor: Struan Robertson Lockhart Marshall, 20 Elmdene Rd., Kenilworth, England

[22] Filed: Jan. 18, 1974

[21] Appl. No.: 434,552

[52] U.S. Cl............. 82/34 B, 82/34 A, 84/DIG. 1, 90/11 E
[51] Int. Cl............................................. B23b 3/36
[58] Field of Search............ 82/34 B, DIG. 1, 34 C, 82/34 A, 34 D; 90/11 E

[56] References Cited
UNITED STATES PATENTS
| | | | |
|---|---|---|---|
| 3,066,578 | 12/1962 | Olton | 90/11 |
| 3,303,731 | 2/1967 | Zawistowski | 82/DIG. 1 X |
| 3,427,906 | 2/1969 | Berly | 82/14 |
| 3,554,064 | 1/1971 | Skillen | 82/DIG. 1 X |

*Primary Examiner*—Andrew R. Juhasz
*Assistant Examiner*—W. R. Briggs
*Attorney, Agent, or Firm*—Olson, Trexler, Wolters, Bushnell & Fosse, Ltd.

[57] ABSTRACT

A stop means for limiting travel of one component relatively to another comprising a member securable to the one component, a probe, and a part to which the member and the probe are connected at lengthwise spaced positions, the part defining a cavity for fluid which in use is at the temperature of one or both components the part being formed from a material with a high expansion coefficient, whereby the distance between the member and the operative end of the probe varies with temperature of said fluid.

5 Claims, 2 Drawing Figures

ADJUSTABLE STOP MEANS

This invention relates to stop means used to limit the travel of one component relatively to another, such stop means being adjustable to vary the controlled limit position under certain circumstances.

The stop means of the invention has particular utility in machine tools such as lathes and has been developed for controlling axial sliding movement of a turret in a turret lathe. In some machines of this kind, the component to be controlled, for example the turret, is of substantial length and it is necessary in the controlling mechanism to compensate for changes in this length due to changes in temperature. In particular, a significant length change takes place between starting of the machine from cold and running at normal working temperature.

It is the object of this invention to provide a stop means which is adjustable in an effective manner in accordance with temperature changes.

According to the invention a stop means for limiting travel of one component relatively to another comprises a member securable to one of the components, a probe arranged to be engaged by the other component to limit its travel, the member and probe being respectively connected to a part defining a hollow cavity, said connections being spaced lengthwise of said part, the cavity having an entry port for fluid which in use is at the temperature of at least one of the components, and the part being of a material having a relatively high coefficient of thermal expansion, whereby the distance between the member and the operative end of the probe, in the direction of the length of the part, varies in accordance with the temperature of the fluid.

Figure 2:
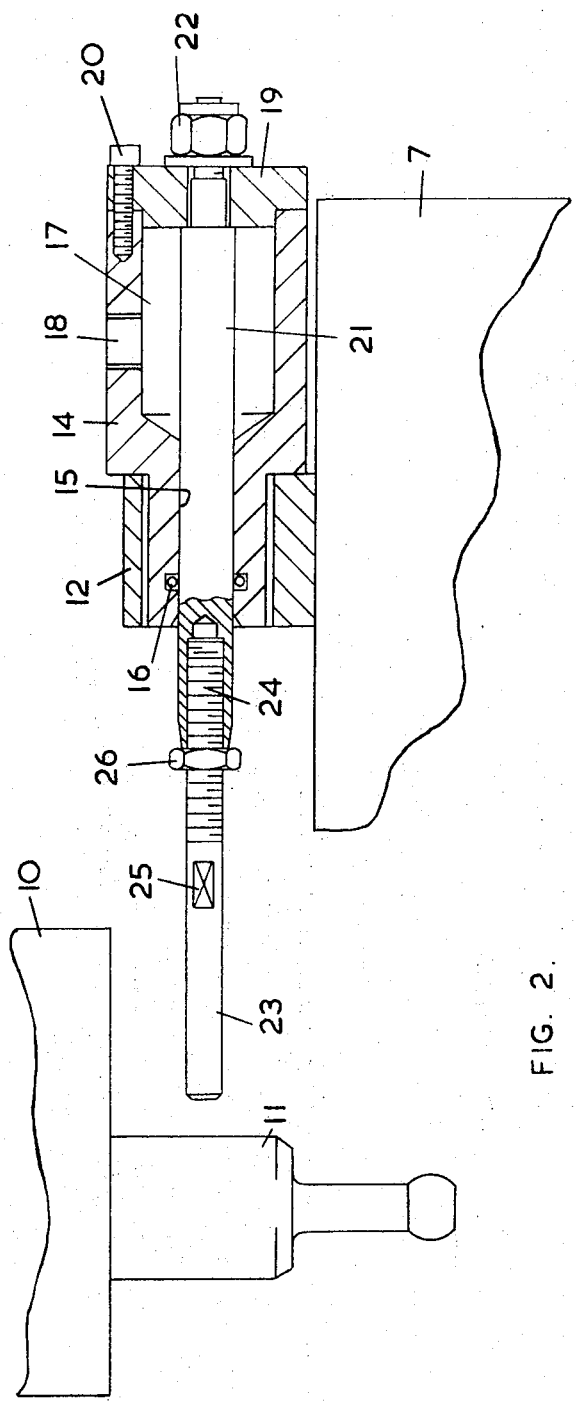

The invention will now be described by way of example with reference to the accompanying drawings in which FIG. 1 is a diagrammatic side view of a turret lathe incorporating the invention, and FIG. 2 is a part cross-sectional view of the adjustable stop means in the lathe, on an enlarged scale.

The lathe shown in FIG. 1 is provided with a base 6 on which is mounted a superstructure 7 in which is supported a turret 8. The turret has a stem, engaged in bearings 9 in the superstructure, and a multi-sided head 8a for the mounting of tools. The turret is provided with drive mechanisms (not shown) for sliding it in the direction of its axis, such movement being for the purpose of carrying out machining operations, and also for indexing it between a number, for example five, angularly spaced positions. Rotatably mounted in the superstructure below the turret is a work spindle (not illustrated) on which a workpiece is supported, to be machined by the tools on the turret head 8a.

Carried on the superstructure is the adjustable stop means which is illustrated in FIG. 2.

The end of the turret 8 remote from the head 8a carries a servo valve 10. The servo valve carries a stylus 11 which engages in a manner not shown with mechanism to control the axial movement of the turret. The stylus 11 moreover is arranged to engage the stop means which positively limits the return travel of the turret.

Since the turret is of substantial length, there is a significant change in its length with change in its temperature. In this example, moreover, the turret is advanced by hydraulic means employing a fluid which is also subject to variation in temperature, particularly during the warming up period of the lathe.

The stop means is arranged to provide adjustment of the position at which the turret is arrested in accordance with changes in the temperature of the hydraulic fluid and thus of the turret itself.

The stop means as illustrated, comprises a member in the form of a collar 12 which is fixed to the super structure 7 of the lathe. This collar 12 has secured within it, the smaller end of a part 14 which is in the form of a stepped hollow cylinder. The cylindrical bore narrower portion 15 has an annular groove containing an O-ring seal 16. The larger portion of the bore of the part 14 defines a hollow cylindrical cavity 17. An entry port 18 for fluid is provided in the wall of the part 14 to allow hydraulic fluid from the supply which motivates the turret, to enter the cavity 17. A further port (not shown) allows for discharge of fluid.

The cavity 17 is moreover, closed at the wider end of the part by a cap 19 secured by screws 20.

Extending through the part 14 is a two part probe. One part 21 of the probe is secured at one end in the cap 19 and is slidably engaged in the smaller portion 15 of the bore of the part 14. The seal 16 moreover, engages against the surface of this part 21. To fix the part 21 of the probe in the cap 19, it is provided with a shoulder and with a nut 22.

The other part 23 of the probe has a plain cylindrical portion engageable with the stylus 11. The opposite end of this part 23, is screw threaded and engages in a coaxial bore at 24 formed in the end of the first part 21 of the probe which extends out of the part 14. The part 23 has flats 25 at a position intermediate its ends whereby it can be engaged by a spanner and a locking nut 26 whereby it can be secured relatively to the first part 21 of the probe in a selected adjusted position. By means of this arrangement, it is possible to alter the effective length of the probe.

The part 14 is constructed from a material having a relatively high coefficient of expansion and in this example, it is made from nylon. Since the connection of the probe to the cap 19 is at the opposite side of the collar 12 from the operative tip of the probe, expansion of the part 14 lengthwise will result in shortening of the distance between the tip and the collar. The temperature of the hydraulic fluid determines the length of the part 14. This expands with increasing temperature and thus alters the position of the end of the probe which engages with the stylus 11 carried on the turret of the lathe.

The expansion of the part 14, is approximately proportional to the expansion of the turret, though such expansion of the part 14 takes place in a direction opposite to the effect of expansion of the turret in relation to its stylus 11. Thus the stop means provides compensation for changes in the length of the turret with changes in temperature.

The choice of material of the part 14 determines the relative expansion of this part and materials having a coefficient of thermal expansion different from that of nylon, may be used.

I claim:

1. A stop means for limiting travel of one component relatively to another comprising a member securable to one of the components, a probe arranged to be engaged by the other component to limit its travel, the member and probe being respectively connected to a part defining a hollow cavity, said connections being spaced lengthwise of said part, the cavity having an entry port for fluid which in use is at the temperature of at least one of the components, and the part being of a material having a relatively high coefficient of thermal expansion, whereby the distance between the member and the operative end of the probe, in the direction of the length of the part, varies in accordance with the temperature of the fluid.

2. A stop means as claimed in claim 1 in which the probe is in two parts which are adjustably connected together whereby the effective length of the probe can be varied.

3. A stop means as claimed in claim 1 in which the part is of hollow generally cylindrical form with an end cap at one end, one end of the probe being secured to said end cap and extending from the other end of said part, the part being secured to the member which is secured to said one component, at a position near said other end of said part.

4. A stop means as claimed in claim 1 in which the part is made from nylon.

5. A stop means as claimed in claim 1 in which the probe is connected to said part at a position remote from that at which it is arranged to engage said other component and the part is secured to the member at a position intermediate said ends of the probe.

* * * * *